(12) United States Patent
Beth Halachmi

(10) Patent No.: US 11,992,026 B2
(45) Date of Patent: May 28, 2024

(54) ICE CREAM PREPARATION APPLIANCE

(71) Applicant: SOLO GELATO LTD., Hila (IL)

(72) Inventor: Barak Beth Halachmi, Hila (IL)

(73) Assignee: SOLO GELATO LTD., Hila (IL)

( * ) Notice: Subject to any disclaimer, the term of this patent is extended or adjusted under 35 U.S.C. 154(b) by 321 days.

(21) Appl. No.: 17/269,923

(22) PCT Filed: Aug. 21, 2019

(86) PCT No.: PCT/IL2019/050938
§ 371 (c)(1),
(2) Date: Feb. 19, 2021

(87) PCT Pub. No.: WO2020/039439
PCT Pub. Date: Feb. 27, 2020

(65) Prior Publication Data
US 2021/0315232 A1    Oct. 14, 2021

(30) Foreign Application Priority Data
Aug. 22, 2018 (IL) .......................................... 261320

(51) Int. Cl.
*A23G 9/22* (2006.01)
*A23G 9/16* (2006.01)
*A23G 9/28* (2006.01)
*A23G 9/46* (2006.01)

(52) U.S. Cl.
CPC .............. *A23G 9/227* (2013.01); *A23G 9/166* (2013.01); *A23G 9/28* (2013.01); *A23G 9/46* (2013.01); *A23G 2220/02* (2013.01)

(58) Field of Classification Search
CPC .......... A23G 9/227; A23G 9/166; A23G 9/28; A23G 9/46; A23G 9/04; A23G 9/16; A23G 9/22; A23G 9/045; A23G 9/224; A23G 9/228; A23G 2220/02
See application file for complete search history.

(56) References Cited

U.S. PATENT DOCUMENTS

| | | | |
|---|---|---|---|
| 4,332,145 A | 6/1982 | Yuhasz et al. | |
| 4,632,566 A * | 12/1986 | Masel | A23G 9/28 366/279 |
| 4,793,151 A * | 12/1988 | Masel | A23G 9/163 62/306 |
| 5,463,878 A | 11/1995 | Parekh et al. | |
| 2007/0186580 A1* | 8/2007 | Kaplan | A23L 3/36 62/530 |

(Continued)

FOREIGN PATENT DOCUMENTS

| | | |
|---|---|---|
| CN | 103649748 A | 3/2014 |
| CN | 104080356 A | 10/2014 |

(Continued)

*Primary Examiner* — Emmanuel E Duke
(74) *Attorney, Agent, or Firm* — Vorys, Sater, Seymour and Pease LLP; Anthony P. Venturino; Maryellen Feehery Hank

(57) ABSTRACT

Provided is an appliance for preparing frozen or semi-frozen aerated edible products of the kind that undergo at least a partial phase change during preparation including ice cream, sorbet, frozen yogurt, soft-serve ice cream, slushes, shakes, blended frozen coffee drinks etc., particularly such an appliance intended for home use, offices, or for small businesses.

8 Claims, 1 Drawing Sheet

(56) References Cited

U.S. PATENT DOCUMENTS

| | | | | |
|---|---|---|---|---|
| 2009/0120306 A1* | 5/2009 | DeCarlo | ................ | A23G 9/224 |
| | | | | 62/340 |
| 2014/0335232 A1 | 11/2014 | Beth Halachmi | | |
| 2017/0099855 A1 | 4/2017 | Cocchi et al. | | |
| 2017/0188600 A1* | 7/2017 | Semo Scharfman | .. | A23G 9/228 |
| 2019/0297914 A1* | 10/2019 | Conte | ................ | A23G 9/14 |

FOREIGN PATENT DOCUMENTS

| | | | | |
|---|---|---|---|---|
| JP | 6-319462 A | 11/1994 | | |
| JP | 2003-505011 A | 2/2003 | | |
| JP | 2015-507920 A | 3/2015 | | |
| JP | 2017-195877 A | 11/2017 | | |
| WO | 2012/122594 A1 | 9/2012 | | |
| WO | WO-2012122594 A1 * | 9/2012 | ............... | A23G 9/04 |
| WO | 2013/121421 A1 | 8/2013 | | |
| WO | 2015/022678 A1 | 2/2015 | | |
| WO | WO-2015092637 A1 * | 6/2015 | ............... | A23G 9/28 |
| WO | 2015/169841 A1 | 11/2015 | | |
| WO | 2018/008028 A1 | 1/2018 | | |
| WO | 2018/109765 A1 | 6/2018 | | |

* cited by examiner

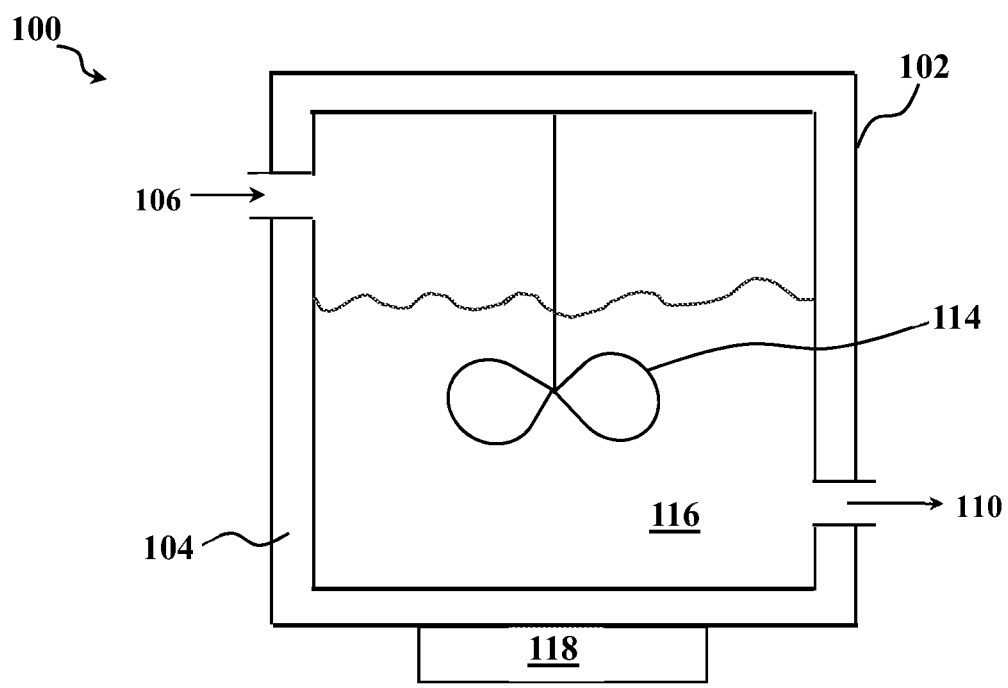

ICE CREAM PREPARATION APPLIANCE

TECHNOLOGICAL FIELD

This disclosure concerns an appliance for preparing frozen or semi-frozen aerated edible products of the kind that undergo at least a partial phase change during preparation including ice cream, sorbet, frozen yogurt, soft-serve ice cream, slushes, shakes, blended frozen coffee drinks etc., particularly such an appliance intended for home use, offices, or for small businesses.

BACKGROUND

References considered to be relevant as background to the presently disclosed subject matter are listed below:
- [1] PCT patent application publication number WO 2013/121421
- [2] PCT patent application publication number WO 2015/022678
- [3] PCT patent application publication number WO 2018/109765
- [4] PCT patent application publication number WO 2018/008028

Acknowledgement of the above references herein is not to be inferred as meaning that these are in any way relevant to the patentability of the presently disclosed subject matter.

Preparation of semi-frozen or frozen aerated edible products (e.g. ice cream) generally involves mixing edible ingredients for forming a mixture, adding gas/air into the mixture (sometimes a by-product of the mixing itself) in order to soften the texture of the mixture and cooling of the mixture.

At present, the majority of ice creams are produced in an industrial process. In this process, ice cream is produced in large volumes and then separated into packages of various sizes, shipped and sold as such to the end users.

There are also known machines for domestic preparation of ice cream, allowing the user to prepare ice cream from a mixture of edible ingredients of his/her liking.

In principle, in such domestic ice cream machines, the user prepares the ingredients mixture and introduces the mixture into the machine which then cools the mix while mixing. Some machines have a built-in cooling arrangement while others only perform mixing, wherein the user is required to transfer the mix, or the machine itself, into the freezer (or any other cooling chamber).

Appliances that prepare a defined number of servings, typically single serves of semi-frozen or frozen aerated edible products are also known [1-3]. Such machines make use of a capsule or a container [4] that contains ingredients in an amount suitable for preparing a single serve of the edible product (a single serve may be, for example, defined according to the acceptable FDA definition as set forth in the Code of Federal Regulations (CFR) Title 21).

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1 is a schematic representation of an appliance according to this disclosure.

DESCRIPTION OF THE INVENTION

The present disclosure provides an appliance 100 (for reference see FIG. 1) for preparing a frozen or semi-frozen aerated edible product of the kind that undergoes at least a partial phase change during its preparation from a mixture of non-frozen ingredients. The frozen or semi-frozen aerated edible product may be ice cream, frozen yogurt, soft-serve ice cream, sorbet, sherbet, granite, gelato, shakes, blended frozen coffee drinks, etc.

The appliance comprises a cooling and processing chamber 102 that is defined between chamber walls 104 and that comprises at least one ingredients' inlet for introducing the ingredients into the chamber 106, at least one finished product outlet 110, which may be a dispensing outlet for dispensing the finished product to a user/consumer and a dasher 114 for mixing and aerating the mixture 116 during a preparation stage of said product. The appliance also comprises a cooling utility 118 that is coupled to and configured for cooling said processing chamber. The cooling utility may be of a kind operating by one of a variety of refrigeration principles known per se.

A unique characteristic of the appliance of this disclosure is that the processing chamber has a thermal mass intended to serve as a heat sink to thereby actively participate in cooling of the mixture during the preparation stage. Thus, once cooled by said cooling utility to a phase-changing temperature that induces said phase change in the mixture of ingredients, the processing chamber functions to passively absorb at least 50%, often 55%, 60%, 65%, 70%, 75% and at times even at least 80% of the thermal energy needed to cool said mixture and maintain it at a phase-changing temperature throughout the preparation stage.

The term "phase-changing temperature" refers to a temperature in which the mixture of ingredients changes its phase from a liquid to a semi-solid or viscous state in which said product is to be dispensed. The phase-changing temperature is inherent to and depends on the nature of the ingredients and the desired texture of said product. As is clear, given the nature of the mixture, the phase-changing temperature is not a fixed temperature but can rather occurs over a range of temperatures with a more pronounced phase change with reduction of temperature. In order to cool the mixture to a temperature that is at or below the phase-changing temperature, the walls of the processing chamber need to be cooled to and maintained at a temperature that is below the phase-changing temperature; this will be referred to herein as "duty temperature". It is to be noted that the duty temperature is not a fixed temperature but rather a temperature range in which said mixture is cooled to a temperature at or below the phase-changing temperature but not too much in order to solidify said product to an extent that would make it difficult to aerate and dispense the product.

It is to a large extent due to the thermal mass of the processing chamber that the duty temperature is maintained throughout the preparation stage. Accordingly, the cooling utility, by itself, may be of a relatively low power as it does not need to have the capacity to provide sufficient cooling to absorb the entire thermal energy needed for maintaining said mixture and the formed cooled edible product at or below the phase-changing temperature during the preparation stage. The requirement for a relatively low power cooling utility may allow to significantly reduce the overall size, volume and may, in some embodiments, reduce the energy consumption of the appliance.

The phase-changing temperature is normally in the range of between about −0.5° C. and about −6° C., typically in the range of between about −1° C. and about −4° C. and preferably in the range of about −1.5° C. and about −3° C. The initial temperature of the chamber and its walls prior to introducing the ingredients is, typically, much lower than the phase-changing temperature, e.g. between about −6° C. and −24° C., and once the ingredients are introduced into the chamber, the temperature of the walls go up to said duty temperature.

The chamber walls are typically made of metal, e.g. aluminum, stainless steel, etc. and may also be coated by other metal, ceramic or a polymer.

By one embodiment, the appliance is configured for the preparation of a single serve product. Such a product has a typical mass of about 75 to 200 g, usually of about 100-170 g, and desirably of about 110-150 g. For such an application a chamber made primarily of aluminum may have an overall mass of about 1 to 3 Kg, typically 1.5 to 2.5 Kg. Thus, the mass ratio between the metal chamber and the food product is in the typical range of about 5 to 40 and desirably in the range of about 10 to 30.

The appliance is typically configured for operating in a duty cycle that comprises a pre-loading stage in which the cooling utility cools the processing chamber walls to below the duty temperature, a loading stage in which the mixture is introduced into said processing chamber and a preparation stage in which the mixture is cooled to the phase-changing temperature while the cooling utility operates to absorb only part of the thermal energy needed to maintain said processing chamber in the duty temperature. In some embodiments, in the pre-loading stage the processing chamber is maintained at a certain stand-by temperature and then, when the appliance is activated to prepare said product, the processing chamber is cooled, prior or during loading, to said duty temperature.

As used herein, the term "about" is meant to encompass deviation of 20% from the specifically mentioned value of a parameter, such as temperature, pressure, concentration, etc.

Whenever a numerical range is indicated herein, it is meant to include any cited numeral (fractional or integral) within the indicated range. The phrases "ranging ranges between" a first indicate number and a second indicate number and "ranging/ranges from" a first indicate number "to" a second indicate number are used herein interchangeably and are meant to include the first and second indicated numbers and all the fractional and integral numerals therebetween.

The invention claimed is:

1. An appliance for preparing a single serve of a frozen or semi-frozen aerated edible products of the kind that undergoes at least a partial phase change at a phase-changing temperature during its-preparation of said single serve from a mixture of non-frozen ingredients, the appliance comprising:
   a cooling and processing chamber defined between chamber walls that comprises at least one ingredients inlet for introducing the ingredients into the chamber, at least one finished product outlet and a dasher for mixing and aerating the mixture during a preparation stage;
   a cooling utility coupled to and configured for cooling said cooling and processing chamber, the cooling utility having a cooling capacity smaller than the thermal energy released during the preparation stage; and
   wherein a mass ratio between the mass of the cooling and processing chamber and the mass of the single serve of edible product to be produced therein is in the range of about 5 to about 40,
   the cooling and processing chamber has a thermal mass such that, once the cooling and processing chamber is cooled by said cooling utility to a duty temperature that is below said phase-changing temperature and induces said phase change, the thermal mass of the cooling and processing chamber is sufficient to absorb at least 50% the thermal energy needed to cool said mixture and maintain the mixture in said duty temperature during the phase changes.

2. The appliance of claim 1, wherein the phase-changing temperature is between −0.5° C. and −6° C., typically −1° C. and −4° C. and preferably between −1.5° C. and −3° C.

3. The appliance of claim 1, wherein the chamber walls are made of metal.

4. The appliance of claim 3, wherein said metal is aluminum.

5. The appliance of claim 1, configured for operating in a duty cycle, comprising:
   a loading stage in which the mixture is introduced into said chamber and the cooling utility cools the chamber walls to a temperature below the duty temperature; and
   a preparation stage in which the mixture is cooled while the cooling utility operates to absorb part of the thermal energy needed to maintain the chamber at about said duty temperature.

6. The appliance of claim 1, configured for operating in a duty cycle, comprising:
   a pre-loading stage in which the cooling utility cools the chamber walls to below the duty temperature,
   a loading stage in which the mixture is introduced into said chamber; and
   a preparation stage in which the mixture is cooled to the phase-changing temperature while the cooling utility operates to absorb part of the thermal energy needed to maintain the chamber at about said duty temperature.

7. The appliance of claim 6, wherein in the pre-loading stage, the chamber is maintained at a stand-by temperature and cooled, prior or during loading, to said duty temperature once the appliance is activated to prepare said product.

8. The appliance of claim 1, wherein the cooling and processing chamber has a mass of between about 1 kg and about 3 kg, and the single serve of edible product has a mass of between about 75 g and about 200 g.

* * * * *